FLARING TOOL

Original Filed Sept. 30, 1950 2 Sheets-Sheet 1

Inventor

GLENN W. WOLCOTT

By

Merchel & Biebel

ATTORNEYS

FLARING TOOL

Original Filed Sept. 30, 1950 2 Sheets-Sheet 2

Inventor

GLENN W. WOLCOTT

By Marechal & Biebel

ATTORNEY

United States Patent Office

Re. 24,051

Reissued Aug. 9, 1955

24,051

FLARING TOOL

Glenn W. Wolcott, Dayton, Ohio, assignor to Penn Aircraft Products, Inc., Dayton, Ohio, a corporation of Ohio Original No. 2,662,575, dated December 15, 1953, Serial No. 187,749, September 30, 1950. Application for reissue April 1, 1955, Serial No. 498,789

13 Claims. (Cl. 153—79)

Matter enclosed in heavy brackets [ ] appears in the original patent but forms no part of this reissue specification; matter printed in italics indicates the additions made by reissue.

This invention relates to tools for flaring tubing, and more particularly to tools for use selectively in forming either single or double flares on tubing.

Many occasions for the use of flared tubing are found in industry, a notable example being in the construction of airplanes and the like which employ great quantities of metal tubing of different sizes and different materials in hydraulic control systems and similar installations. Furthermore, since it is important for such uses to obtain maximum strength in the connections embodying flared tubing, there has been recently an increasing tendency to require such tubing to be double flared except where the material therein is of special strength, as in the case of heavy gauge stainless steel tubing and the like.

A double flare, in which the end of the tubing is folded inwardly to provide a double thickness in the flared portion, may be conveniently produced in two forming operations. In the first step, the end of the tubing is compressed axially to form a circular rib having the general configuration in cross-section of a reverse flare. In the second step, the end section of this rib is crimped or folded inwardly of the tubing to complete the double flare. However, separate forming members are required for these two steps and a difficulty in operations requiring double flaring of tubing of different sizes is that although the second step in double flaring is readily performed by a simple conical flaring member such as is used to form single flares, a separate double flaring punch or other preliminary forming member is required for the preliminary operation on each different side of tubing.

It is accordingly one of the principal objects of the present invention to provide a flaring tool of simple and compact construction which includes in a single unit the clamp for holding the tube to be flared, a cone for both single flaring and completing a double flare, and a plurality of double flaring punches arranged for selective use with tubing of different sizes.

Another object is to provide a flaring tool in which a plurality of double flaring punches and a flaring cone are carried by a rotary carrier member in a housing in which the tube clamping mechanism and an operating member such as a compression screw are also mounted, with the carrier member being rotatable to bring either the flaring cone or a selected punch into operative relation between the screw and the tube to be flared, thus providing for a complete double flaring operation on a given tube without changing or adjusting the tool except for movement of the carrier member to select the punch of proper size and then to shift the cone into position to complete the double flare.

It is also an object of the invention to provide a flaring tool of the above character in which the several double flaring punches are calibrated and arranged to effect automatic gauging of the tube to be flared in proper position in the clamping mechanism of the tool for accurate double flaring, and further to provide such a tool having a selectively operable gauge member for use in properly positioning a tube to be single flared.

Other objects and advantages of the invention will be apparent from the following description, the accompanying drawings and the appended claims.

In the drawings—

Figure 12:
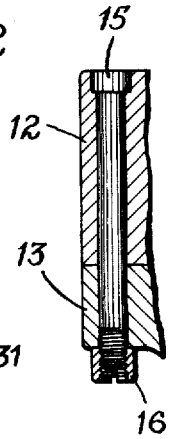
Fig. 12 is a fragmentary section on the line 12—12 of Fig. 2.

Referring to the drawings, which illustrate a preferred embodiment of the present invention, the housing of the tool is formed in two parts, the upper part 12 and lower part 13 being secured together by means of elongated bolts 15 and cylindrical nuts 16. As shown in Fig. 12, the bolts 15 are threaded only adjacent their ends, and the major portion of their length is smoothly cylindrical to provide a dowel action for aligning the housing parts. A compression screw 20 having a handle 21 is threaded in a bushing 22 pressed into the upper housing 12, the bushing 22 being readily secured in position by having its outer surface straight knurled for force fitting in the housing.

The lower housing 13 is largely hollow to define a chamber for receiving a pair of clamping blocks 25 for holding the tubing to be flared. Each of these blocks 25 is square sided and provided along each side thereof with a semi-cylindrical jaw portion 26 having the upper end chamfered at 27 at a suitable angle to the axis of the jaw, for example 33°, each jaw being of a different size to engage tubing of a correspondingly different diameter. The clamping blocks 25 are operated by a compression screw 30 having a handle 31 and threaded in a bushing 32 pressed into one end of the housing portion 13, and the screw 30 carries a pad 33 for engaging one side of one of the clamping blocks to urge the two blocks together.

Figure 1:
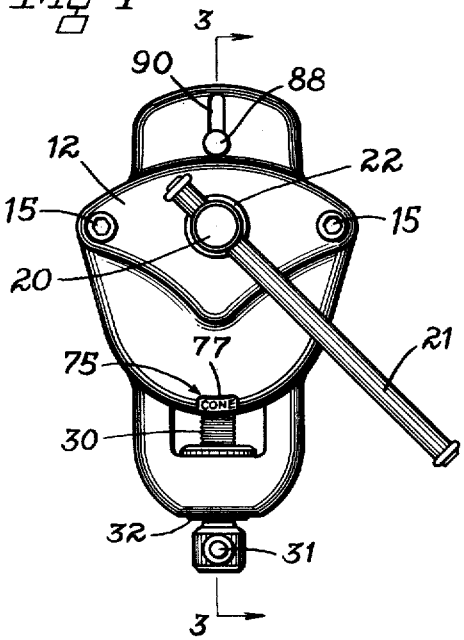
Fig. 1 is a plan view of a flaring tool in accordance with the invention and with the tool shown in properly adjusted position to form a single flare or to complete a double flare.
Figure 2:
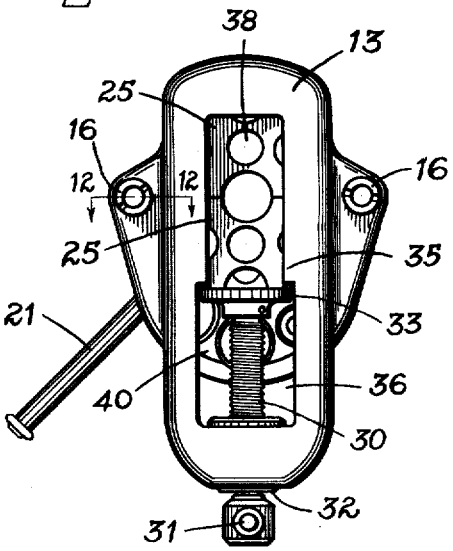
Fig. 2 is a bottom view of the tool.
Figure 8:
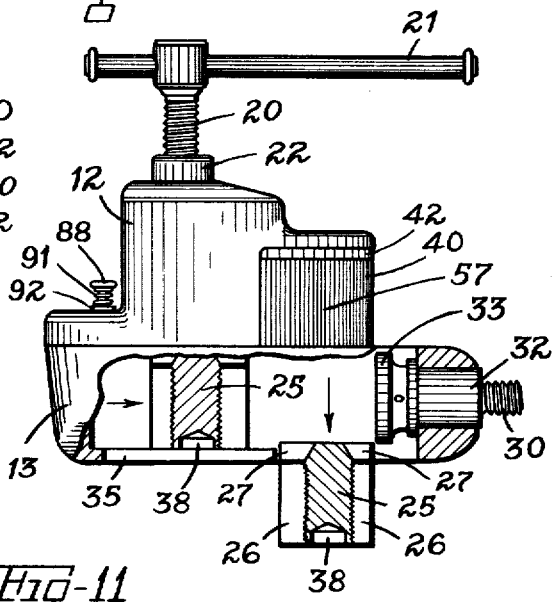
Fig. 8 is a view of the tool in side elevation and with a portion broken away to illustrate the operation of changing the clamping blocks for a different size of tubing.

Referring particularly to Figs. 2 and 8, the underside of the lower housing portion 13 is formed with a ledge or flange portion 35 which forms a track for the clamping blocks, this track being relieved at the portion 36 to provide an opening of slightly greater width than the cross-section of the blocks to provide for removal and rearrangement of the blocks as indicated in Fig. 8 when the compression screw 30 is fully retracted. The wall 37 opposite screw 30 is located in predetermined relation with the upper housing portion and with the blocks 25 so that when the blocks 25 are seated against it, their cooperating jaws 27 will be accurately aligned with the compression screw 20. Finger holes 38 are provided in the underside of each block to facilitate sliding them into and out of position in the housing.

Figure 6:
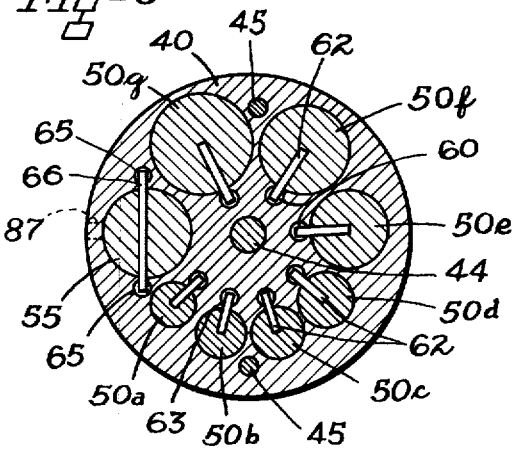
Fig. 6 is a section through the rotor taken on the line 6—6 of Fig. 3 and showing only the parts lying in the sectional plane.

The upper housing 12 carries the rotor unit, which includes a cylindrical rotor 40 and an index plate 42, the rotor and plate being rotatably mounted in the housing by means of a pivot pin 44 and being secured against relative angular movement by a pair of dowels 45. The rotor 40 forms a carrier for a plurality of double flaring punches identified generally as 50, seven of these punches being shown and being identified as 50a and 50g inclusive. Each punch 50 has a working tip on the lower end thereof which comprises a pilot portion 51 (Fig. 9) and a generally concave frusto-conical working face 52 surrounding the pilot portion 51. These punches 50 are each of different sizes to fit tubing of correspondingly different diameters, and they are arranged as shown in Fig. 6 with their centers defining a circle centered on the axis of the pivot pin 44 and having a radius equal to the distance between the axes of the pivot pin 44 and the compression screw 20. A flaring cone 55 is also mounted in the rotor 40 between the punches 50a and 50g of the respectively largest and smallest diameters.

The rotor unit 40 can accordingly be readily rotated on the pivot 44 to bring either the cone 55 or any selected punch 50 into line with the compression screw 20 for operation thereby, the plate 42 having a series of angularly spaced holes 56 therethrough coaxial with the centers of the several punches and cone for receiving the screw 20 and the screw thus forming the operating member for the cone 55 and all of the punches 50. The upper housing 12 is partially open to expose about one-half of the periphery of the rotor for ready access in adjusting the unit, and the periphery of the rotor 40 is knurled at 57 to facilitate its use. Also, in order to retain the cone and punches normally out of the way in the rotor, a spring return is provided for retaining each of them yieldably in upper or retracted position. For this purpose, the rotor 40 is provided with a slotted bore 60 adjacent the bore for each punch 50, and each bore 60 contains a spring 61 which is engaged by a pin 62 set in the side of the adjacent punch as shown.

It will be noted that the bores 60 are not contiguous with the bores for the punches but are spaced therefrom to leave lands 63 on either side of the pins 62 for guiding and preventing cocking of the pins. A similar arrangement is provided for the cone 55 except that it includes two bores 65, one on either side of the cone, and either two pins or one elongated pin extending through the cone as shown at 66. This double guiding arrangement is desirable for the cone 55 since its cylindrical portion is of substantially less extent than that of each of the punches 50, and accordingly the provision of springs on either side thereof gives additional guiding action and assurance against possible cocking of the cone in the rotor.

Figure 5:
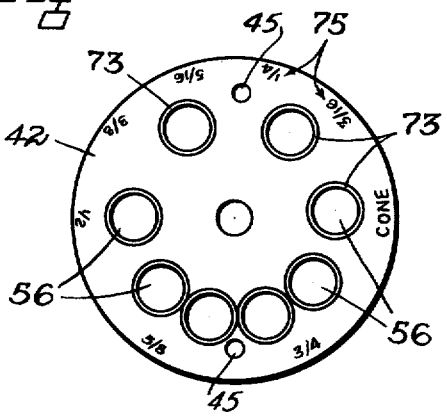
Fig. 5 is a detail view of the rotor unit of the tool.
Figure 7:
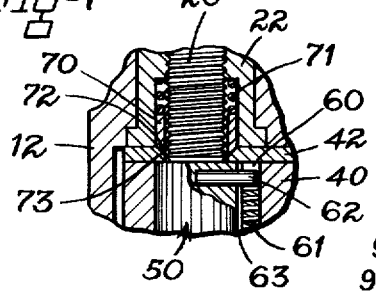
Fig. 7 is a fragmentary section illustrating the mechanism for indexing the rotor in the housing.

Provision is made for positively indexing the rotor in the housing to assure accurate registry of the cone or punches with the compression screw 20. Referring particularly to Figs. 5 and 7, the bore in the bushing 22 is enlarged at its lower end to receive a short axially movable sleeve 70 and a spring 71 for biasing the sleeve 70 towards the plate 42. The lower end of this sleeve is tapered at 72, and each of the holes 56 in the plate 42 is countersunk at 73 to form beveled recesses for receiving this tapered end of the sleeve with a detent action. Also, the plate 42 is provided with a series of indicia 75 designating the "cone" and the several sizes of tubing adapted to be double flared by the corresponding punches 50, and the upper housing 12 is cut away at 77 for viewing the proper one of the indicia 75 which corresponds to the cone or the particular punch in operative or indexed position with respect to the screw 20.

It is important for proper flaring that the tubing be accurately located in the clamp mechanism with just the right length at the end of the tube in position for flaring, and the present tool incorporates gauging means for automatically accomplishing this purpose. In double flaring, the several punches 50 are so proportioned with respect to the parts of the tool cooperating therewith that when a given punch is indexed in operative position but is still in fully retracted position against the underside of plate 42, the portion 52 of its working tip will be at just the correct distance above the clamping blocks 25 to act as a gauge for the tubing. Thus referring to Fig. 9, the parts are so proportioned that with the punch 50e in indexed position for performing the preliminary double flaring operation on tubing 80 of one-half inch in diameter, but with the punch still in retracted position, when the tubing 80 is inserted in the clamping blocks until its upper end abuts the part 52 of the punch, it will be properly poistioned for the preliminary double flaring step.

Figure 9:
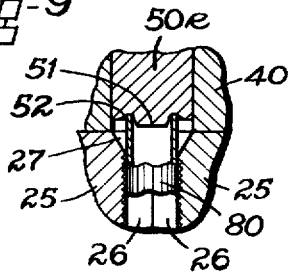
Figs. 9, 10 and 11 are fragmentary sections illustrating progressive stages in the formation of a double flare with the tool.
Figure 10:
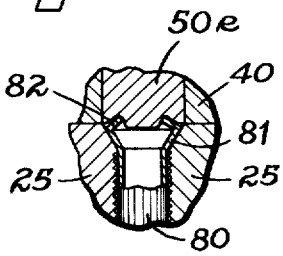
Figure 11:
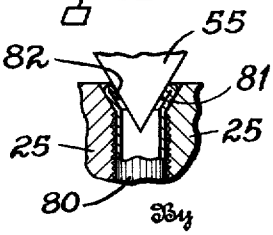

Fig. 10 shows the relative position of the parts following completion of the preliminary double flaring operation by tightening the screw 20 to force the punch 50e downwardly from its position shown in Fig. 9 until it contacts the upper end of the clamping blocks as shown. The end of the tube 80 has been shaped or formed in a circumferential rib composed of a lower or inner portion 81 flared outwardly in the tapered portion of the jaws of blocks 25 and an upper or outer portion 82 which is flared inwardly from the portion 81. Fig. 11 shows the final step in the double flaring operation, which is carried out by backing off the screw 20, shifting the rotor until the cone 55 is in indexed position, and then retightening the screw 20 to force the cone 55 against the tubing and thus to fold the tubing portion 82 inwardly until it is substantially parallel with and flat against the portion 81 and in overlying relation therewith.

Figure 3:
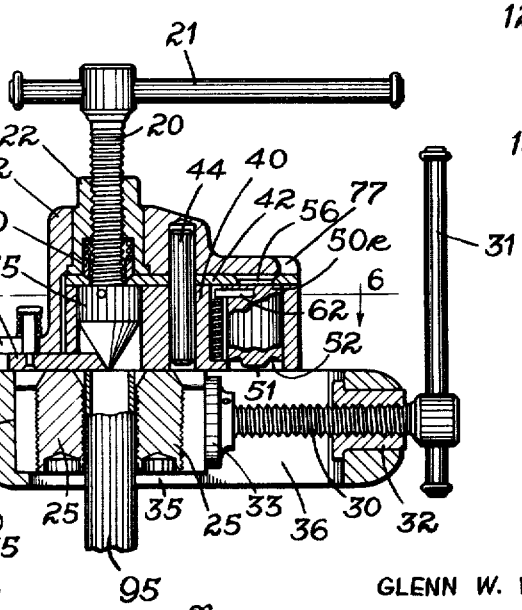
Fig. 3 is a vertical section on the line 3—3 of Fig. 1 and illustrating the operation of the tool to form a single flare.
Figure 4:
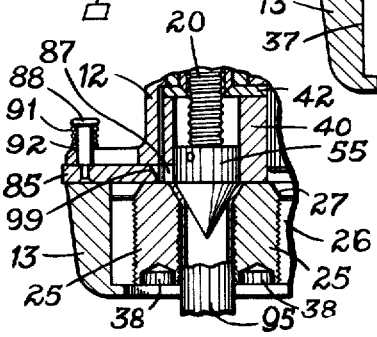
Fig. 4 is a fragmentary section similar to Fig. 3 showing the completed single flaring operation.

The tool also incorporates a selectively usable gauge for accurately positioning tubing to be single flared. Referring to Figs. 3 and 4, a finger 85 is slidably mounted between the housing portions 12 and 13 through a groove 86 in the upper housing portion 12 and a cooperating groove 87 in the underside of the rotor 40 connecting with the bore therein for the cone 55. A pin 88 is set in the finger 85 to extend upwardly as a handle through a slot 90 in housing portion 12 and is provided with a spring 91 and washer 92 to hold the finger 85 frictionally in adjusted position in the tool. Accordingly, when this finger is pushed into its advanced position shown in Fig. 3, it will just clear the clamping blocks 25 and will extend partly across the jaws therein to act as a stop for positioning the upper end of a tube 95 to be single-flared. Then after the screw 30 is tightened to clamp the tube, the screw 20 is tightened as shown at Fig. 4 to drive the cone 55 into the end of the tube and thus to form the single flare. The finger 85 has an end portion 99 beveled at substantially the same angle as the tapered portion of the flaring cone, so that if the operator should forget to retract this finger before operating screw 20, the cone will automatically cam it away as it moves downwardly.

It will accordingly be seen that the present invention provides a flaring tool which is compact in construction and simple to opearte and which is capable, in the form shown in the drawing, of double flaring seven different sizes of tubing and single flaring eight sizes, it being apparent that this range may be varied as required for particular purposes by changing the proportions of the housing and rotor to include a greater or lesser number of tube flaring punches. Adjustment of the tool to change the size of tube to be flared requires nothing more than shifting of the clamping blocks and reindexing of the rotor, and after the tool is once set for a particular size of tubing to be double flared, no change is required in the tool between the first and second forming steps except for rotating the rotor to shift the flaring cone into indexed position after the first forming step is completed. Also, with the only separable parts of the tool being the two sets of clamping blocks necessary to cover the entire range of eight tubing sizes as shown, the workman is required to carry only the tube itself and the pair of clamping blocks not in use at the moment, which makes the tool very convenient to use, and even if one or more of the blocks should be lost, they are easily replaced without in any way affecting the body of the tool.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A flaring tool comprising a housing adapted to be positioned in predetermined working relation with a tube to be double flared, an operating member mounted for axial movement in said housing in coaxal relation with the working position of said tube, a carrier member in said housing, a plurality of double flaring punches supported in said carrier member and of graduated effective sizes for shaping the ends of tubes of correspondingly different sizes in preparation for double flaring, and means supporting said carrier member for movement in said housing to position a selected one of said punches in line with said operating member for operation thereby.

2. A flaring tool comprising a housing adapted to be positioned in predetermined working relation with a tube to be double flared, an operating member mounted for axial movement in said housing in coaxial relation with the working position of said tube, a rotor mounted in said housing for rotational movement about an axis, a plurality of double flaring punches supported in said rotor with the axes thereof arranged concentrically about said rotor axis for selective alignment with said operating member upon rotation of said rotor, said punches being of graduated effective sizes for shaping the ends of tubes of correspondingly different sizes in preparation for double flaring, and yieldable means for normally retaining each said punch in retracted position within said rotor.

3. A flaring tool comprising a housing adapted to be positioned in predetermined working relation with a tube to be double flared, an operating member mounted for axial movement in said housing in coaxial relation with the working position of said tube, a rotor mounted in said housing for rotational movement about an axis, a plurality of double flaring punches supported in said rotor with the axes thereof arranged concentrically about said rotor axis for selective alignment with said operating member upon rotation of said rotor, said punches being of graduated effective sizes for shaping the ends of tubes of correspondingly different sizes in preparation for double flaring, and a cone supported in said rotor in said concentric arrangement with said punches for movement into line with said tube and said operating member for operation by said operating member to complete the double flare.

4. A flaring tool comprising a housing adapted to be positioned in predetermined working relation with a tube to be double flared, an operating member mounted for axial movement in said housing in coaxial relation with the working position of said tube, a rotor mounted in said housing for rotational movement about an axis, a plurality of double flaring punches supported in said rotor with the axes thereof arranged concentrically about said rotor axis for selective alignment with said operating member upon rotation of said rotor, said punches being of graduated effective sizes for shaping the ends of tubes of correspondingly different sizes in preparation for double flaring, a cone supported in said rotor in said concentric arrangement with said punches for movement into line with said tube and said opearting member for operation by said operating member to complete the double flare, means for selectively indexing said rotor with relation to said operating member to maintain said cone or selected one of said punches in operative relation with said operating member, and indicating means on said rotor for designating the particular one of said cone and punches in said indexed position.

5. A flaring tool comprising a housing, a compression screw mounted in said housing, a rotor mounted in said housing for rotational movement about an axis spaced from said screw, a plurality of double flaring punches and a flaring cone supported in said rotor with the axes thereof arranged concentrically about said rotor axis for selective alignment with said screw upon rotation of said rotor for operation by said screw, an indexing sleeve supported for axial movement on said screw, said sleeve having a beveled end, means for spring loading said sleeve toward said rotor, and said rotor having in the upper surface thereof a plurality of beveled recesses coxial with said punches and cone for yieldably receiving said beveled end of said sleeve to index said rotor with respect to said screw.

6. A flaring tool comprising a housing, an operating member in said housing in coaxial relation with the working position of said tube, a plurality of double flaring punches supported in said carrier member and of graduated effective sizes for shaping the ends of tubes of correspondingly different sizes in preparation for double flaring, means supporting said carrier member for movement in said housing to position a selected one of said punches in line with said operating member for operation thereby, said carrier member including a top plate for retaining said punches therein, said plate having holes therethrough aligned with said punches for receiving said operating member therethrough to operate said punches, a sleeve mounted for axial movement with respect to said operating member and concentric therewith, means for spring loading said sleeve toward said rotor, said sleeve having a beveled lower end, and each of said holes in said plate being countersunk for yieldably receiving said beveled sleeve end therein to index said rotor with respect to said operating member.

7. A flaring tool comprising a housing adapted to be positioned in predetermined working relation with clamping means for holding a tube to be double flared, an operating member mounted for axial movement in said housing in coaxial relation with the working position of said tube, a rotor mounted in said housing for rotational movement about an axis, a plurality of double flaring punches supported in said rotor with the axes thereof arranged concentrically about said rotor axis for selective alignment with said operating member upon rotation of said rotor, said punches being of graduated effective sizes for shaping the ends of tubes of correspondingly different sizes in preparation for double flaring, each said punch including a portion adapted to engage the upper end of the tube to be double flared thereby to effect a double flaring forming operation thereon, and yieldable means normally retaining each said punch in retracted position in predetermined spaced relation with the working position of said clamping means for gauging the proper position of the tube to be double flared in said clamping means by contact between the end of said tube and said tube-engaging portion of said punch.

8. A flaring tool comprising a housing adapted to be positioned in predetermined working relation with clamping means for holding a tube to be double flared, an operating member mounted for axial movement in said housing in coaxial relation with the working position of said tube, a rotor mounted in said housing for rotational movement about an axis, a plurality of double flaring punches supported in said rotor with the axes thereof arranged concentrically about said rotor axis for selective alignment with said operating member upon rotation of said rotor, said punches being of graduated effective sizes for shaping the ends of tubes of correspondingly different sizes in preparation for double flaring, a cone supported in said rotor in said concentric arrangement with said punches for movement into line with said tube and operating member for operation by said operating member to complete the double flare, said cone also being adapted to form a single flare on a tube held in said clamping means, a gauge member in said housing adapted to abut the upper end of a tube to be single flared for gauging the proper single flaring position of said tube in said clamping means, and means supporting said gauge member in said housing for movement between a retracted position free of said rotor and providing for rotation of said rotor independently of said gauge member and an advanced position extending within said rotor in the path of said cone and in line with the upper end of said tube.

9. A flaring tool comprising a housing adapted to be positioned in predetermined working relation with clamping means for holding a tube to be double flared, an operating member mounted for axial movement in said housing in coaxial relation with the working position of said tube, a rotor mounted in said housing for rotational movement about an axis, a plurality of double flaring punches supported in said rotor with the axes thereof arranged concentrically about said rotor axis for selective alignment with said operating member upon rotation of said rotor, said punches being of graduated effective sizes for shaping the ends of tubes of correspondingly different sizes in preparation for double flaring, a cone supported in said rotor in said concentric arrangement with said punches for movement into line with said tube and operating member for operation by said operating member to complete the double flare, said cone also being adapted to form a single flare on a tube held in said clamping means, a gauge member movable in said housing between a retracted position and an advanced position in the path of said cone to abut the upper end of a tube to be single flared for gauging the proper single flaring position of said tube in said clamping means, and said gauge member having a beveled end thereon adapted for engagement by the conical point of said cone upon operating movement of said cone to move said gauge member to retracted position.

10. A flaring tool comprising a housing adapted to be positioned in predetermined working relation with clamping means for holding a tube to be double flared, an operating member mounted for axial movement in said housing in coaxial relation with the working position of said tube, a rotor mounted in said housing for rotational movement about an axis, a plurality of double flaring punches supported in said rotor with the axes thereof arranged concentrically about said rotor axis for selective alignment with said operating member upon rotation of said rotor, said punches being of graduated effective sizes for shaping the ends of tubes of correspondingly different sizes in preparation for double flaring, each said punch including a portion adapted to engage the upper end of the tube to be double flared thereby to effect a double flaring forming operation thereon, yieldable means normally retaining each said punch in retracted position in predetermined spaced relation with said clamping jaws for gauging the proper position of the tube to be double flared in said jaws by contact between the end of said tube and said tube-engaging portion of said punch, a cone supported in said rotor in said concentric arrangement with said punches for movement into line with said tube and operating member for operation by said operating member to complete the double flare, said cone also being adapted to form a single flare on a tube held in said clamping means, a gauge member in said housing adapted to abut the upper end of a tube to be single flared for gauging the proper single flaring position of said tube in said clamping means, and means supporting said gauge member in said housing for movement between a retracted position free of said rotor and providing for rotation of said rotor independently of said gauge member and an advanced position extending within said rotor in the path of said cone and in line with the upper end of said tube.

*11. A flaring tool comprising a housing adapted to be positioned in predetermined working relation with a tube to be double flared, an operating member mounted for axial movement in said housing in coaxial relation with the working position of said tube, a carrier member in said housing, a plurality of double flaring punches supported in said carrier member for individual movement with respect to said carrier member and parallel with said operating member, said punches being of graduated effective sizes for shaping the ends of tubes of correspondingly different sizes in preparation for double flaring, and means supporting said carrier member for movement in said housing in a plane substantially perpendicular with said operating member to position a selected one of said punches in line with said operating member for operation thereby.*

*12. A flaring tool comprising a housing, an operating member mounted for axial movement in said housing, means carried by said housing establishing a working position for a tube to be double flared in accurately aligned coaxial relation with said operating member, a carrier member in said housing, a plurality of double flaring punches supported in said carrier member for individual movement with respect to said carrier member and parallel with said operating member, said punches being of graduated effective sizes for shaping the ends of tubes of correspondingly different sizes in preparation for double flaring, and means supporting said carrier member for rotary movement in said housing about an axis parallel with said operating member to position a selected one of said punches in line with said operating member for operation thereby.*

*13. A flaring tool comprising a housing, an operating member mounted for axial movement in said housing, means carried by said housing establishing a working position for a tube to be double flared in accurate aligned coaxial relation with said operating member, a carrier member in said housing, a plurality of double flaring punches supported in said carrier member and of graduated effective sizes for shaping the ends of tubes of correspondingly different sizes in preparation for double flaring, means supporting said carrier member for movement in said housing to position a selected one of said punches in line with said operating member for operation thereby, each said punch including a portion adapted to engage the upper end of the tube to be double flared thereby to effect a double flaring forming operation thereon, and means for locating each selected said punch in said carrier member in predetermined axially spaced relation with said working position for gauging the proper axial position in said housnig of the tube to be double flared by contact between the end of said tube and said tube engaging portion of said punch.*

References Cited in the file of this patent or the original patent

UNITED STATES PATENTS

| | | |
|---|---|---|
| 408,586 | Coleman | Aug. 6, 1889 |
| 1,350,904 | Walters | Aug. 24, 1920 |
| 1,914,235 | Benbow | June 13, 1933 |
| 1,950,154 | Rosenberg | Mar. 6, 1934 |
| 1,955,913 | Holsclaw | Apr. 24, 1934 |
| 1,976,878 | Eden | Oct. 16, 1934 |
| 2,302,794 | Neukirch | Nov. 24, 1942 |
| 2,415,520 | Obecny | Feb. 11, 1947 |
| 2,505,665 | Franck | Apr. 25, 1950 |
| 2,505,666 | Franck | Apr. 25, 1950 |

FOREIGN PATENTS

| | | |
|---|---|---|
| 805,941 | France | Sept. 7, 1936 |

Notice of Adverse Decision in Interference

In Interference No. 87,028 involving Reissue Patent No. 24,051, G. W. Wolcott, Flaring tool, final judgment adverse to the patentee was rendered November 27, 1956, as to claim 1.

[*Official Gazette January 22, 1957.*]